US007706416B2

(12) United States Patent
Kim et al.

(10) Patent No.: US 7,706,416 B2
(45) Date of Patent: Apr. 27, 2010

(54) OPTICAL COMMUNICATION SYSTEM CAPABLE OF PROVIDING ANALOG TELEPHONE SERVICE

(75) Inventors: Han-Sang Kim, Seoul (KR); Chan-Yul Kim, Bucheon-si (KR); Jun-Ho Koh, Suwon-si (KR); Yun-Je Oh, Yongin-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 793 days.

(21) Appl. No.: 11/190,416

(22) Filed: Jul. 27, 2005

(65) Prior Publication Data
US 2006/0039357 A1    Feb. 23, 2006

(30) Foreign Application Priority Data
Aug. 23, 2004    (KR)    ............ 10-2004-0066529

(51) Int. Cl.
  H04J 3/04    (2006.01)
  H04J 3/00    (2006.01)
(52) U.S. Cl. ............ 370/535; 370/498; 370/464; 370/352; 709/237; 398/68
(58) Field of Classification Search ............ 370/535, 370/498, 464, 352, 401, 400, 389, 468; 709/237; 725/118; 398/68
See application file for complete search history.

(56) References Cited

U.S. PATENT DOCUMENTS 5,444,849 A *  8/1995  Farrand et al. ............ 709/237
6,977,945 B1 * 12/2005  Noda et al. ............ 370/468
2005/0138670 A1 *  6/2005  Ploumen ............ 725/118

FOREIGN PATENT DOCUMENTS

JP    2002-247115    8/2002
JP    2004-096737    3/2004

* cited by examiner

Primary Examiner—Aung S Moe
Assistant Examiner—Jamal Javaid
(74) Attorney, Agent, or Firm—Cha & Reiter, LLC

(57) ABSTRACT

An optical communication system for transmitting telephone voice data to a subscriber terminal using an optical line is disclosed. The system includes an OLT (Optical Line Terminal) multiplexing the telephone voice data together with the broadcasting data and communication data, converting the optical signals transferred upward into electric signals, demultiplexing and converting the uplink telephone voice data into analog telephone voice signals to transfer the converted analog telephone voice signals to a PSTN; a plurality of ONTs (Optical Network Terminals) for converting the optical signals transferred from the OLT into electric signals, demultiplexing and converting the demultiplexed downlink telephone voice data into analog signals to transfer the converted analog signals to subscribers' telephones; and an optical branching filter for branching the signals from the OLT to the plurality of ONTs, combining, and transferring the signals from the plurality of ONTs to the OLT.

8 Claims, 8 Drawing Sheets

OPTICAL COMMUNICATION SYSTEM CAPABLE OF PROVIDING ANALOG TELEPHONE SERVICE

CLAIM OF PRIORITY

This application claims priority to an application entitled "Optical Communication System Capable of Providing Analog Telephone Service," filed in the Korean Intellectual Property Office on Aug. 23, 2004 and assigned Serial No. 2004-66529, the contents of which are hereby incorporated by reference.

BACKGROUND OF THE INVENTION

1. Field of the Invention

The present invention relates to an FTTH (fiber to the home) system, and more particularly to a system for transmitting telephone voice data to a subscriber terminal using an optical line.

2. Description of the Related Art

The traditional telephone system uses a copper wire as a transmission medium for transmission of an analog voice data between a TDX switching system and a subscriber's telephone. However, as the subscribers' demand for digital data transmission increases, a digital data modulation method using the existing copper wire for the telephone has been developed. The digital data modulation method is classified into one method of transmitting an analog band and a digital transmission band separately, and another method in which a telephone voice signal is converted into a digital signal to enable the digital transmission. The former method refers to a xDSL technology, such as ADSL, VDSL, etc., that processes uplink/downlink data using a frequency modulation technique, except for a frequency of analog voice data. The xDSL technology separates the baseband telephone voice data from digital data through a splitter at a subscriber end. Meanwhile, the later method involves converting the analog telephone voice data into digital data and, then transmitting the digital data from the telephone office to PBX of MDF or a small PBX (i.e., keyphone) of a subscriber's house.

FIG. 1 is a view illustrating an example of the conventional apparatus for converting the telephone voice signal into the digital signal and performing the digital transmission on the whole network.

Referring to FIG. 1, a DAA (Data Access Arrangement) 100, which receives an analog voice signal 106 that includes analog signaling data, transfers the analog signaling data to a control unit 101, and converts the analog voice signal 106 except for the analog signaling data into digital voice data, and then transfers digital data 105 that includes the signaling signal and the digital voice data to a downlink 103 of a PCM bus for a subsequent transmission to a subscriber end. The DAA receives digital data transferred from the subscriber end through an uplink 104 of the PCM bus, and converts the received digital data into an analog voice signal.

Meanwhile, an SLIC (subscriber line interface unit) 107 of the subscriber end performs similar function as the DAA 100. That is, the SLIC 107 receives and converts the digital data 105 transferred to the downlink 103 of the PCM bus into analog voice data 108, and receives and converts the analog voice data from the subscriber into digital voice data in order to transfer the converted digital voice data to the uplink 104 of the PCM bus.

FIG. 2 is a view exemplifying signals input/output between a TDX switching system 200 of a phone company and a home telephone in the existing telephone communications using analog voice data.

The signals transmitted/received between the TDX switching system 200 and the home telephone may be an on-off hook signal 201 produced when a user picks up or hangs up a handset. A dial tone signal 202 is produced when the user picks up the handset. An address signal 203 is produced when the user dials the other party's phone number. A ring-back tone signal 204 signifies that the user can hear while the opposite party's telephone is ringing according to a user's call connection attempt, and a busy tone signal 205 us produced while the other party's telephone line is busy. A DTx signal 206 or DRx signal 207 corresponding to voice data is produced while speaking, and a ring signal 204 is produced while the other party is making a call to the user, etc.

Among the signaling information described above, the signaling that does not correspond to the voice bandwidth (of about 300~3000 Hz) is called out-of-band signaling information, and it is impossible to transmit this information through an analog-to-digital (A/D) conversion. If the transmission is performed according to the conventional method as described above, a complicated process must be performed in a manner that the telephone office transmits a digital type signal that is multiplexed in the form of T1 or E1, and the system in MDF or at home must convert the transmitted digital signal into an analog signal. This method is not suitable to the optical communication system whereby several voice data are transmitted through one optical fiber in a point-to-point manner from the center base station to the subscriber. As a result, there is a need for an improved optical communication system that can support a telephone service.

SUMMARY OF THE INVENTION

Accordingly, the present invention has been designed to solve the above and provides additional advantages, by providing an optical communication system that can implement a telephone service through an analog-to-digital conversion and a digital-to-analog conversion of a telephone voice signal in an FTTH optical communication system.

In one embodiment, there is provided an optical communication system for providing a broadcasting service and a data communication service to a specified number of subscribers which includes an OLT (Optical Line Terminal) for generating digital downlink telephone voice data by receiving analog telephone voice signals of the specified number of subscribers from a PSTN (Public Switched Telephone Network), dividing the analog telephone voice signals by subscribers and converting the divided analog telephone voice signals into the digital telephone voice data, multiplexing the generated telephone voice data together with broadcasting data for the broadcasting service and communication data for the data communication service, and converting the multiplexed data into optical signals to transfer the converted optical signals by subscribers. The OLT converts the optical signals transferred upward into electric signals, demultiplexes and converts the uplink telephone voice data into analog telephone voice signals in order to transfer the converted analog telephone voice signals to the PSTN.

The system further includes a plurality of ONTs (Optical Network Terminals), the number of which corresponds to the specified number of subscribers, for converting the optical signals transferred from the OLT into electric signals, for demultiplexing the broadcasting data, the communication data, and the digital-converted downlink telephone voice data, and for converting the demultiplexed downlink telephone voice data into analog signals to transfer the converted analog signals to subscribers' telephones, wherein the OLTs generates digital uplink telephone voice data by converting the analog voice data from the subscribers' telephones into the digital telephone voice data, multiplexes the digital uplink telephone voice data together with the uplink communication data of the OLT to transfer the multiplexed data to the OLT; and an optical branching filter for branching the signals from the OLT to the plurality of ONTs and for combining and transferring the signals from the plurality of ONTs to the OLT.

BRIEF DESCRIPTION OF THE DRAWINGS

The above features and advantages of the present invention will be more apparent from the following detailed description taken in conjunction with the accompanying drawings, in which.

DETAILED DESCRIPTION

Figure 1:
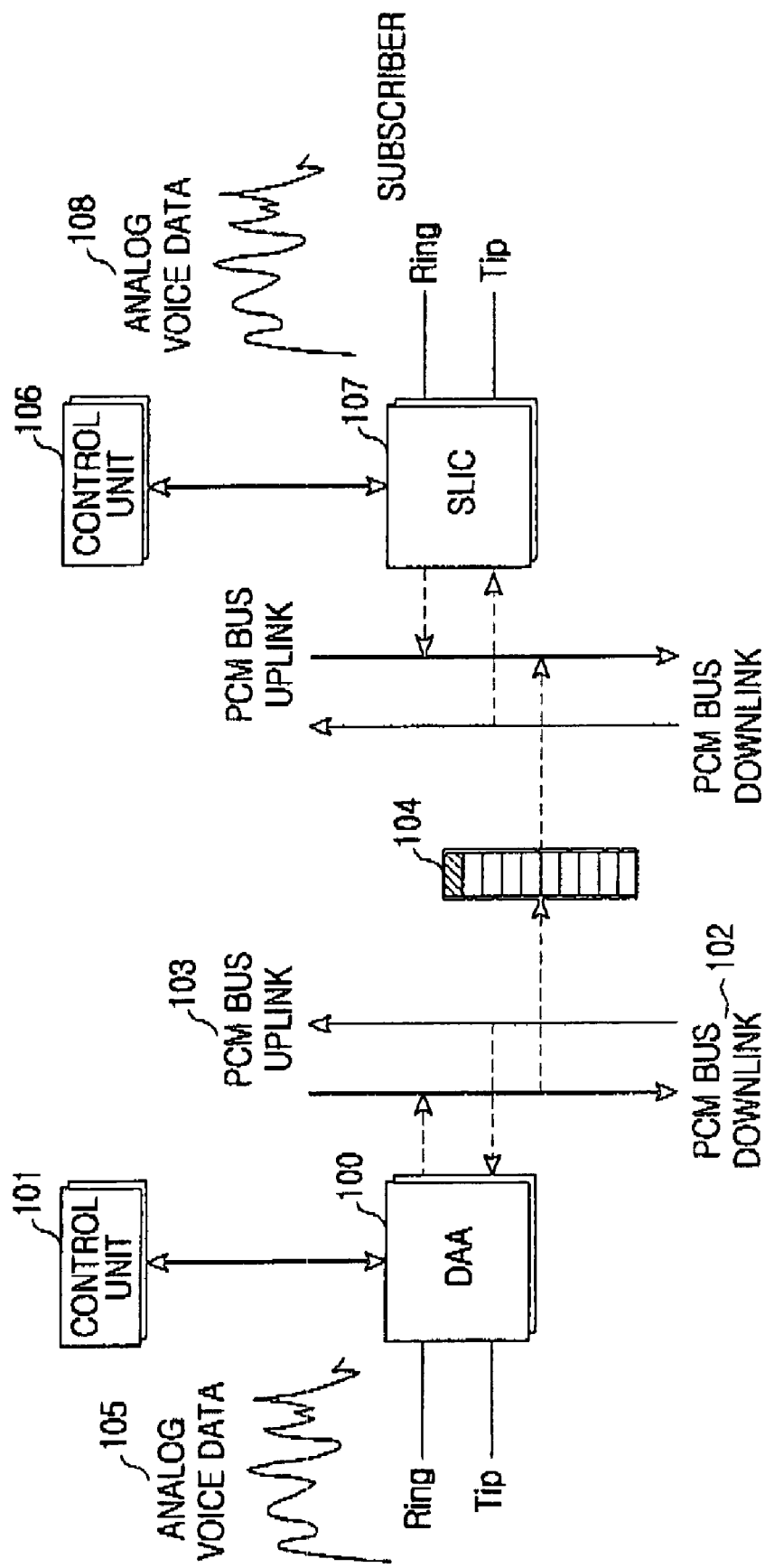
FIG. 1 illustrates a conventional apparatus for converting a telephone voice signal into a digital signal.
Figure 2:
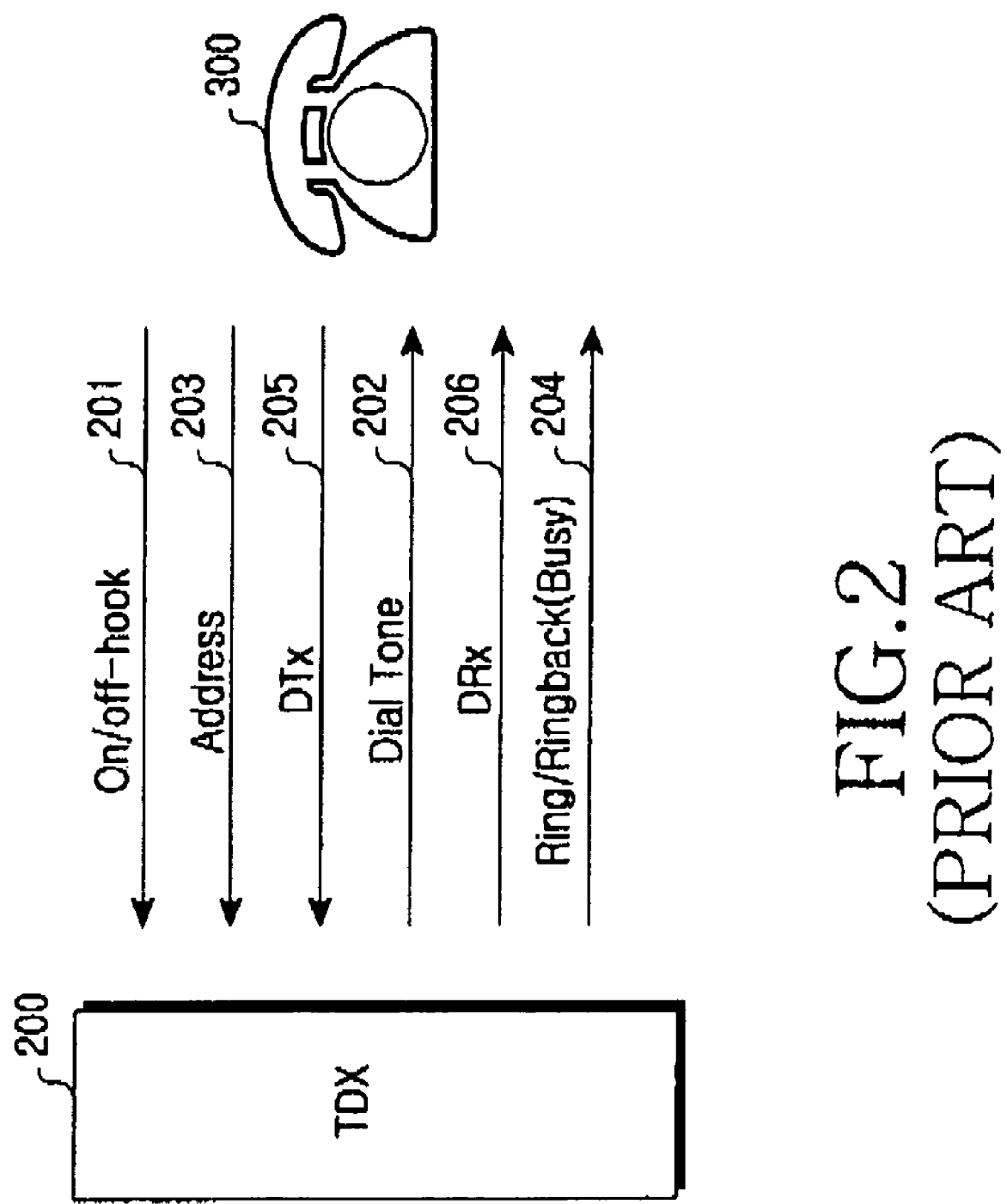
FIG. 2 is a view exemplifying signals input/output between a TDX switching system of a phone company and a home telephone according to the traditional telephone communications using analog voice data.

Hereinafter, embodiments of the present invention will be described in detail hereinafter with reference to the accompanying drawings. In the following description of the present invention, the same drawing reference numerals are used for the same elements even in different drawings. For the purposes of clarity and simplicity, a detailed description of known functions and configurations incorporated herein will be omitted as it may obscure the subject matter of the present invention.

Figure 3A:
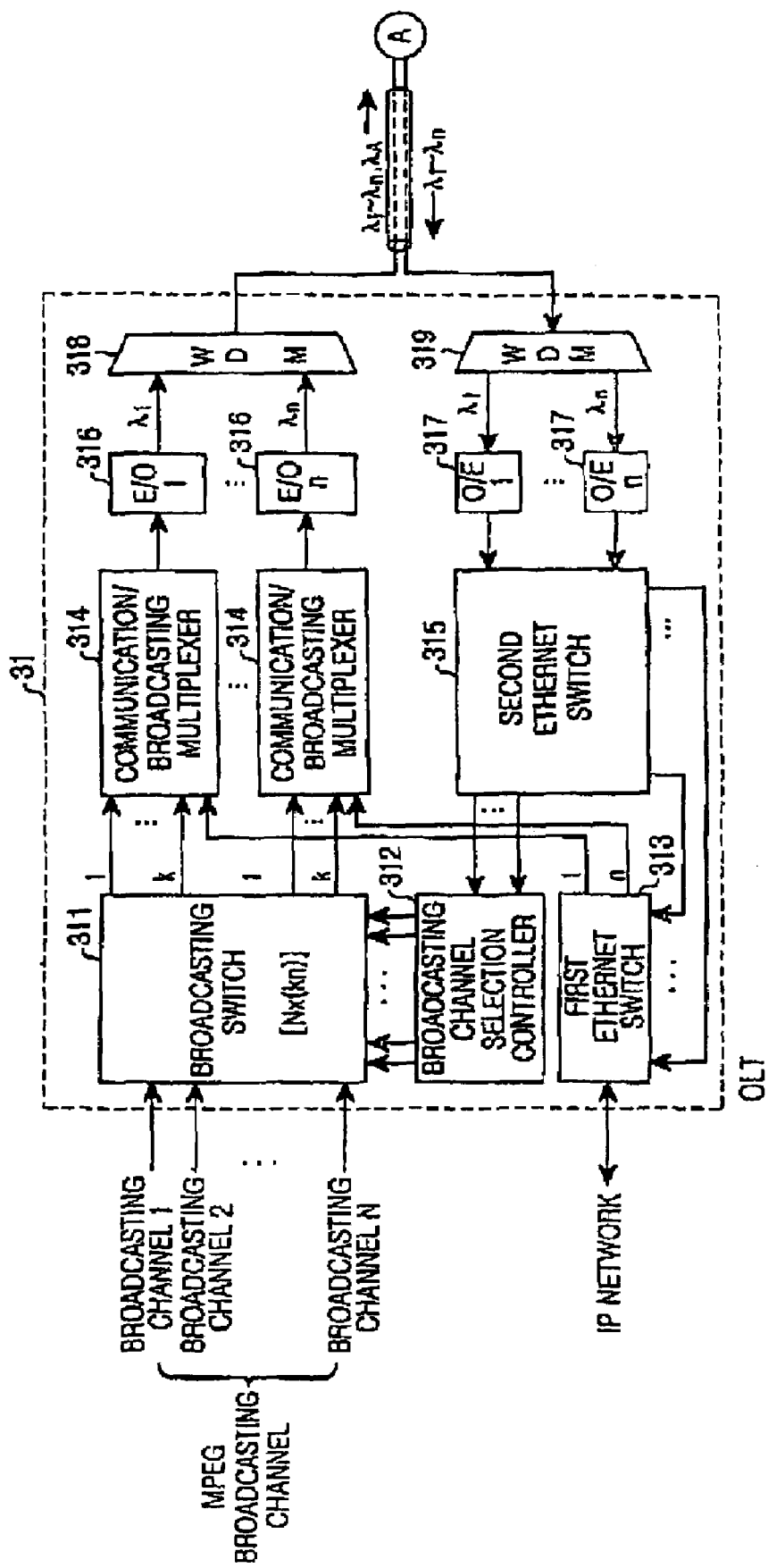
FIG. 3 is a block diagram illustrating the construction of an FTTH type optical communication system according to the present invention.
Figure 3B:
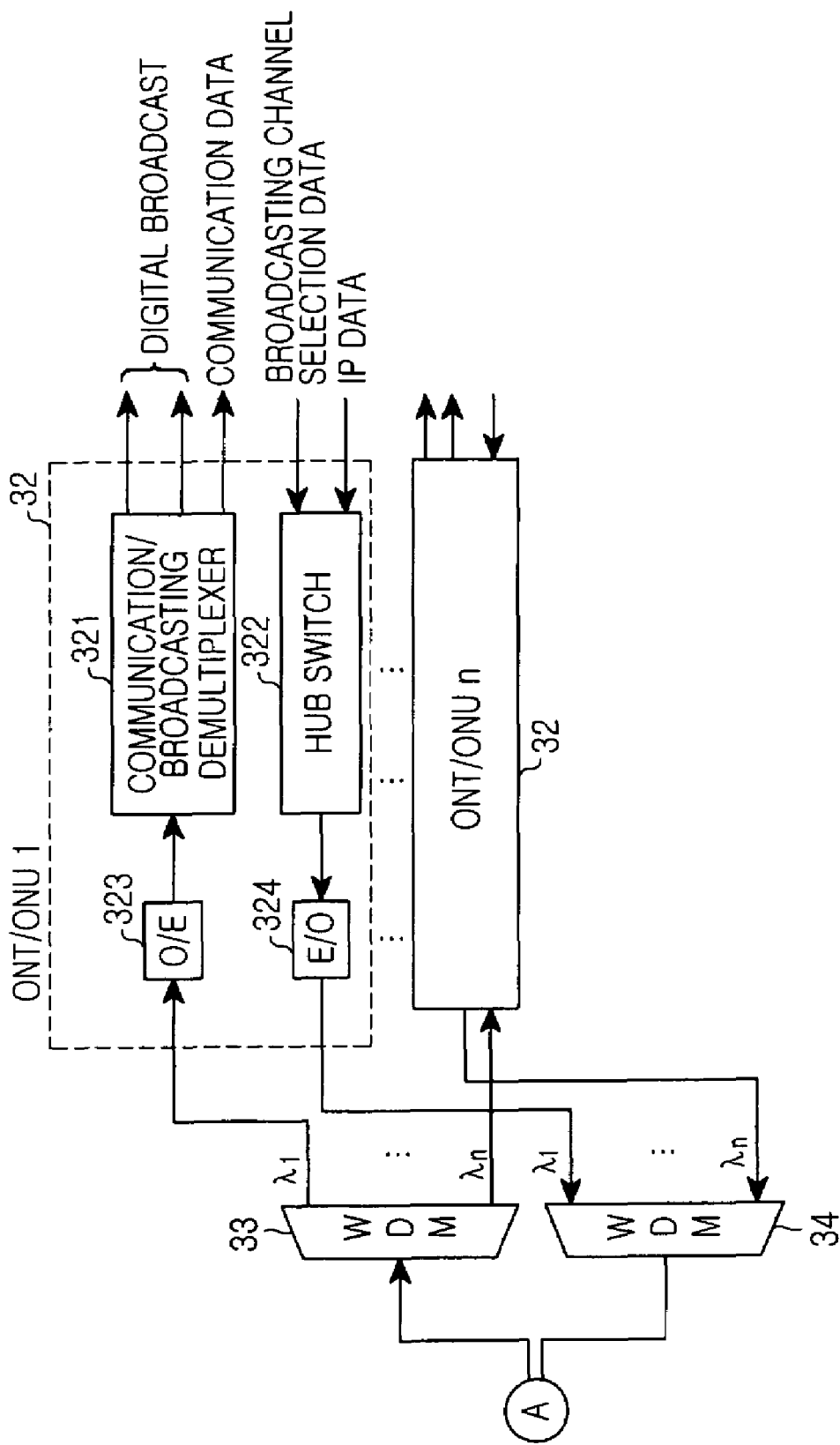

FIGS. 3a and 3b are block diagrams illustrating the construction of an FTTH type optical communication system according to the present invention.

As shown, the WDM-PON type FTTH (fiber to the home) includes an OLT (Optical Line Terminal) 31, connected to a broadcasting network (i.e., a digital broadcasting network) for a broadcasting service and an IP network for a communication service, for receiving and performing an electrical/optical conversion of a digital broadcasting signal from the broadcasting network and a communication signal from the IP network so as to transmit them as one optical signal, and for transferring a communication signal transferred from a service user to the IP network. The WDM-PON type FTTH further includes an ONT/ONU (Optical Network Terminal/Optical Network Unit) 32 that is a user device for transferring the digital broadcasting signal and the communication signal received from the OLT 31 to the service user and transferring the communication signal from the service user to the OLT 31, and a WDM demultiplexer 33 for WDM-demultiplexing the digital broadcasting signal and the communication signal ($\lambda_1 \sim \lambda_{32}$) from the OLT 31 and transferring the demultiplexed signals to the ONT/ONU 32, and a WDM multiplexer 34 for multiplexing the communication signal ($\lambda_1 \sim \lambda_{32}$) from the ONT/ONU 32 and transferring the multiplexed signal to the OLT 31.

The OLT 31 includes a broadcasting switch 311 for switching MPEG (Motion Picture Experts Group) broadcasting data; a broadcasting channel controller 312 for selecting a broadcasting channel according to a service user's request; a first Ethernet switch 314 for switching the communication data to an upper IP network or to a communication/broadcasting multiplexer 314 for data transmission to the ONT/ONU 32; the communication/broadcasting multiplexer 314 for multiplexing the communication data and the digital broadcasting data; a second Ethernet switch 315 for separately switching channel information data of the digital broadcast desired by the service user and the communication data from the service user; an optical transmitter 316 for performing an electrical/optical conversion of the multiplexed communication/broadcasting data; an optical receiver 317 for receiving and performing an optical/electrical conversion of the communication data from the service user that is transmitted from the ONT/ONU 32; a WDM multiplexer 318 for multiplexing optically modulated signals by wavelengths; and a WDM demultiplexer 319 for separating the optical signal transmitted from the ONT/ONU 32 by wavelengths.

The ONT/ONU 32 includes an optical receiver 323 for receiving and performing the optical/electrical conversion of the optical communication/broadcasting signal transmitted from the OLT 31, a communication/broadcasting demultiplexer 321 for separating the communication signal and the digital broadcasting signal, a hub switch 322 for combining digital broadcasting selection data for selecting the digital broadcasting channel desired by the user and the communication data from the service user, and an optical transmitter 324 for performing the electrical/optical conversion of the data to transmit the data to the OLT 31.

In operation, the downlink transmission of the WDM-PON as illustrated in FIGS. 3a and 3b is as follows. Here, the downlink means the transmission from the OLT 31 to the ONT/ONU 32.

First, the MPEG digital broadcasting data transferred from an SO (Service Operator) and so on is inputted to the broadcasting switch 311. The respective service user designates a desired TV channel, and the broadcasting channel selection controller 312 transfers such a signal for designating the TV channel to the broadcasting switch, so that only the digital broadcasting channel desired by the respective service user is selected and transferred. In this case, since several digital broadcasting channels may be required by the respective service user, the broadcasting channel selection controller 312 switches a maximum of K digital broadcasting channels. That is, since several broadcasting receivers may be used at home, maximum number of digital broadcasting channels can be set by the specification of the WDM-PON.

The communication data transmitted from an upper IP network is switched by service users, and inputted to the communication/broadcasting multiplexer 314 along with the digital broadcasting signals. The communication/broadcasting multiplexer 314 multiplexes the input communication and broadcasting data via a single channel using techniques such as TDM (Time-Division Multiplexing), FDM (Frequency Division Multiplexing), etc.

The communication and digital broadcasting data multiplexed by the communication/broadcasting multiplexer 314 is electrically/optically converted by the optical transmitter 316. Note that the respective optical transmitter 316 has inherent transmission wavelengths of $\lambda_1 \sim \lambda_n$.

The communication/broadcasting multiplexed optical signal having the wavelengths of $\lambda_1 \sim \lambda_n$ is divided by wavelengths, and then optically/electrically converted by the optical receiver 323.

The optically/electrically converted communication/broadcasting multiplexed signal is demultiplexed to K digital broadcasting channels and communication data by the communication/broadcasting demultiplexer 321, and then transferred to a terminal device of a service user, such as a digital TV, a computer, etc.

Meanwhile, the uplink transmission of the WDM-PON is performed as follows. Here, the uplink means the transmission from the ONT/ONU 32 to the OLT 31.

The signals transmitted from the service user to the OLT 31 may be a broadcasting channel selection signal for viewing the desired digital broadcasting channel, IP communication data generated from a computer, etc. These data are combined by the hub switch 322, electrically/optically converted into transmission wavelengths allocated by the respective ONTs/ONUs 32, and then multiplexed together with the wavelength signals transmitted from other ONTs/ONUs 32 by the WDM multiplexer 34.

Thereafter, the multiplexed WDM optical signal is transmitted to the OLT 31 through an optical cable, and divided by wavelengths by the WDM demultiplexer 319 in the OLT 31.

The wavelength signals divided by wavelengths are optically/electrically converted by the optical receiver 317 and then inputted to the second Ethernet switch 315. The Ethernet switch 315 switches the broadcasting channel selection signal to the broadcasting channel selection controller 312, and switches the IP communication data to the first Ethernet switch 313 connected to the IP network.

The signal input to the broadcasting channel selection controller 312 is used to control the broadcasting switch 311, and the signal transmitted to the first Ethernet switch 313 is transferred to the upper IP network.

In order to provide the analog telephone service in the optical communication system as described above, the OLT 31 must be provided with the DAA (Data Access Arrangement) device so that it can perform a digital conversion for a downlink optical transmission and convert the digital signal into an analog voice signal in order to transfer the converted signal upward. Also, the respective ONT 32 must be provided with the SLIC device so that it performs a digital conversion to transfer the analog telephone voice signal of the subscriber through an uplink optical transmission and convert the digital signal transferred from the OLT into an analog voice signal in order to transfer the converted analog voice signal downward, i.e., to the subscriber.

Figure 4A:
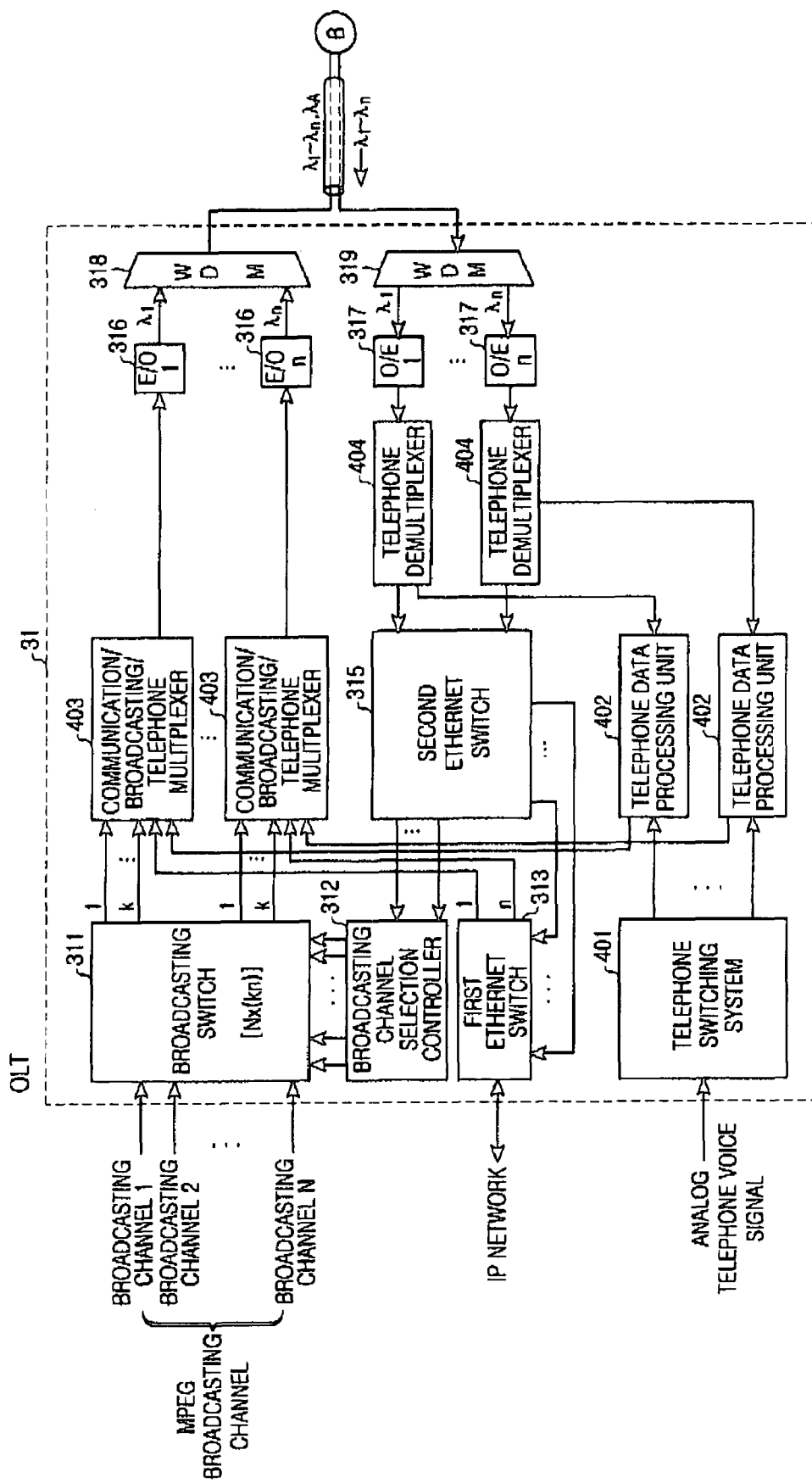
FIGS. 4a to 4b are block diagrams illustrating the construction of the optical communication system that provides a telephone service according to the present invention.
Figure 4B:
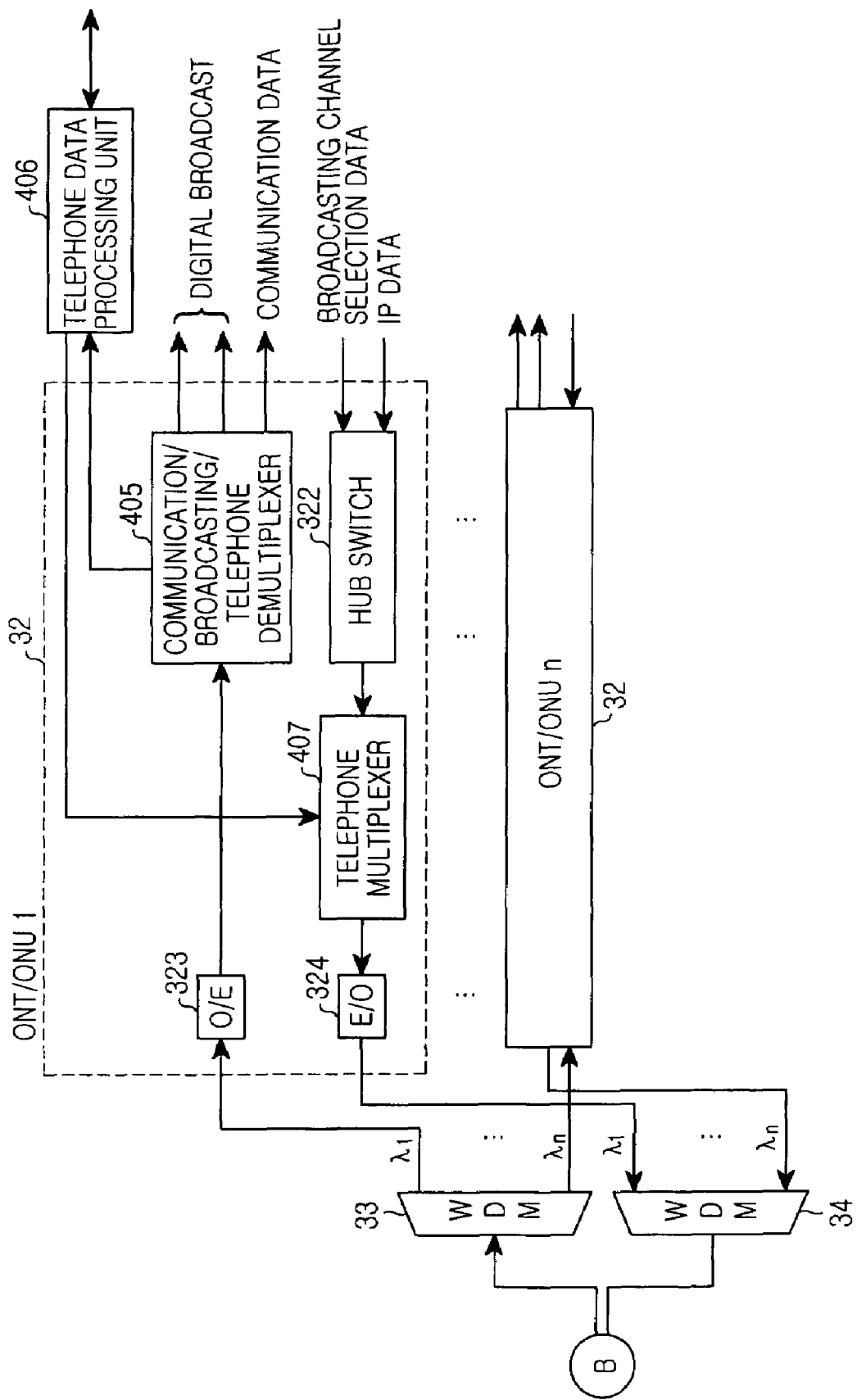

FIGS. 4a to 4b are block diagrams illustrating the construction of the optical communication system that provides a telephone service according to another embodiment of the present invention.

As shown in FIGS. 4a and 4b, in order to provide a telephone service according to the embodiment of the present invention, the OLT 31 is provided with a telephone switching device so that it switches the analog telephone data of the respective subscriber, converts the analog telephone data into a digital telephone signal, and then multiplexes the digital telephone signal to transmit the multiplexed optical signal. Meanwhile, the ONT 32 extracts the digital telephone signal from the transferred optical signal by performing an optical/electrical conversion of the transferred optical signal and demultiplexing the converted electric signals, converts the extracted digital telephone signal into an analog signal, and then transfers the analog telephone signal to the respective subscriber to achieve a telephone call. As described above, although the downlink signal transfer from the OLT to the ONT is exemplified, it will be apparent that the uplink signal transfer from the ONT to the OLT can also be performed in reverse order of the downlink signal transfer.

The operation of the optical communication system that provides the telephone service will be explained in more detail hereinafter.

The WDM-PON type FTTH system includes an OLT (Optical Line Terminal) 31, connected to a broadcasting network (here, the broadcasting network means a digital broadcasting network) for a broadcasting service and an IP network for a communication service, for receiving and performing an electrical/optical conversion of a digital broadcasting signal from the broadcasting network, a communication signal from the IP network, and a telephone voice signal from a telephone system so as to transmit the digital broadcasting signal, the communication signal, and the telephone signal as one optical signal, and for transferring a communication signal and a telephone signal transferred from a service user to the IP network and the telephone system, respectively; an ONT/ONU (Optical Network Terminal/Optical Network Unit) 32 that is a user device for transferring the digital broadcasting signal, the communication signal, and the telephone signal received from the OLT 31 to the service user and for transferring the communication signal and the telephone signal from the service user to the OLT 31; and a WDM demultiplexer 33 for WDM-demultiplexing the digital broadcasting signal, the communication signal, and the telephone signal ($\lambda_1 \sim \lambda_{32}$) from the OLT 31 and for transferring the demultiplexed signals to the ONT/ONU 32; and a WDM multiplexer 34 for multiplexing the communication signal and the telephone signal ($\lambda_1 \sim \lambda_{32}$) from the ONT/ONU 32 and for transferring the multiplexed signal to the OLT 31.

The OLT 31 includes a broadcasting switch 311 for switching MPEG (Motion Picture Experts Group) broadcasting data; a broadcasting channel controller 312 for selecting a broadcasting channel according to a service user's request; a first Ethernet switch 313 for switching the communication data to an upper IP network or to a communication/broadcasting/telephone multiplexer 403 for the data transmission to the ONT/ONU 32; a second Ethernet switch 315 for separately switching channel information data of the digital broadcast desired by the service user and the communication data from the service user; a telephone switching system 401 for receiving analog telephone voice signals by subscribers from a telephone network and separately switching the analog telephone voice signals by subscribers; a telephone data processing unit 402 for converting the analog telephone voice signals by subscribers transferred through the telephone switching system into digital telephone data to transfer the converted digital telephone data to the communication/broadcasting/telephone multiplexer 403 and for converting uplink digital telephone data transferred from a telephone demultiplexer 407 into analog telephone voice signal in order to transfer the converted analog telephone voice signal to the telephone switching system 401; the communication/broadcasting/telephone multiplexer 403 for multiplexing the communication data, digital broadcasting data, and digital telephone data; an optical transmitter 316 for performing an electrical/optical conversion of the multiplexed communication/broadcasting/telephone data according to the wavelengths allocated to the respective subscribers; an optical receiver 317 for receiving and performing an optical/electrical conversion of the communication/telephone data from the service user that is transmitted from the ONT/ONU 32; a telephone demultiplexer 404 for demultiplexing the optically/electrically converted communication/telephone data and transferring the communication data and the digital telephone data to the second Ethernet switch 315 and the telephone data processing unit 402, respectively; a WDM multiplexer 318 for multiplexing optically modulated signals by wavelengths; and a WDM demultiplexer 319 for separating the optical signal transmitted from the ONT/ONU 32 by wavelengths.

The ONT/ONU 32 includes an optical receiver 323 for receiving and performing the optical/electrical conversion of the optical communication/broadcasting/telephone signal transmitted from the OLT 31; a communication/broadcasting/telephone demultiplexer 405 for separating the communication data, digital broadcasting data, and the digital telephone data from the electrically converted multiplexed communication/broadcasting/telephone data; a telephone data processing unit 406 for converting the digital telephone data demultiplexed through the communication/broadcasting/telephone demultiplexer 405 into an analog telephone voice signal to transfer the converted analog telephone voice signal to a subscriber's telephone and for converting the uplink analog telephone voice signal from the subscriber's telephone into digital telephone data to transfer the converted digital telephone data to the telephone multiplexer 407; a hub switch 322 for combining the digital broadcasting selection data for selecting the digital broadcasting channel desired by the user and the communication data from the service user; the telephone multiplexer 407 for multiplexing the data output from the hub switch 322 and the digital telephone data output from the telephone data processing unit 406; and an optical transmitter 324 for performing the electrical/optical conversion of the output signal of the telephone multiplexer 407 and transmitting the converted optical signal to the OLT 31. Here, since the transmission of the broadcasting and communication data has already been explained with reference to FIG. 3, the detailed explanation thereof will be omitted to avoid redundancy.

The downlink transmission is performed as follows. Here, the downlink means the transmission from the OLT 31 to the ONT/ONU 32.

The telephone switching system 401 receives the analog telephone voice signals of the respective subscribers from the external telephone network and separately outputs the analog telephone voice signals by subscribers. The telephone data processing unit 402 divides the output analog telephone voice signals by subscribers into analog voice data and signaling data, converts them into digital telephone data, and then transfers the digital telephone data from subscribers to the communication/broadcasting/telephone multiplexers 403.

The respective communication/broadcasting/telephone multiplexer 403 multiplexes the digital telephone data together with the broadcasting data and the communication data by subscribers. The multiplexed communication/broadcasting/telephone data are electrically/optically converted, and then transferred to the ONTs/ONUs 32 corresponding to the respective subscribers.

In the ONT/ONU 32, the transferred optical signal is optically/electrically converted through the optical receiver 323, and then the communication data, the broadcasting data, and the digital telephone data are demultiplexed through the communication/broadcasting/telephone demultiplexer 405.

The telephone data reverse-processing unit 406 that has received the digital telephone data converts the input digital telephone data into an analog telephone voice signal and transfers the converted analog telephone voice signal to the subscriber's telephone.

Meanwhile, the uplink transmission is performed as follows. Here, the uplink means the transmission from the ONT/ONU 32 to the OLT 31.

The analog telephone voice signal input from the respective subscriber is divided into analog voice data and signaling data through the telephone data reverse-processing unit 406, then converted into digital data and transferred to the telephone multiplexer 407 as the uplink digital telephone data.

The telephone multiplexer 407 multiplexes the uplink communication data input through the hub switch 322 and the uplink digital telephone data input through the telephone data reverse-processing unit 406. The multiplexed signal is electrically/optically converted and then transferred to the OLT 31.

In the OLT 31, the optical signal transferred from the ONT/ONU 32 is optically/electrically converted and the uplink communication data and the uplink digital telephone data are demultiplexed through the telephone demultiplexer 408. The demultiplexed uplink communication data is transferred to the second Ethernet switch, and the demultiplexed uplink digital telephone data is transferred to the telephone data processing unit 402.

Thereafter, the telephone data processing unit 402 converts the input uplink digital telephone data in an analog telephone voice signal and transfers the converted analog telephone voice signal to the external telephone network through the telephone switching system 401.

Figure 5:
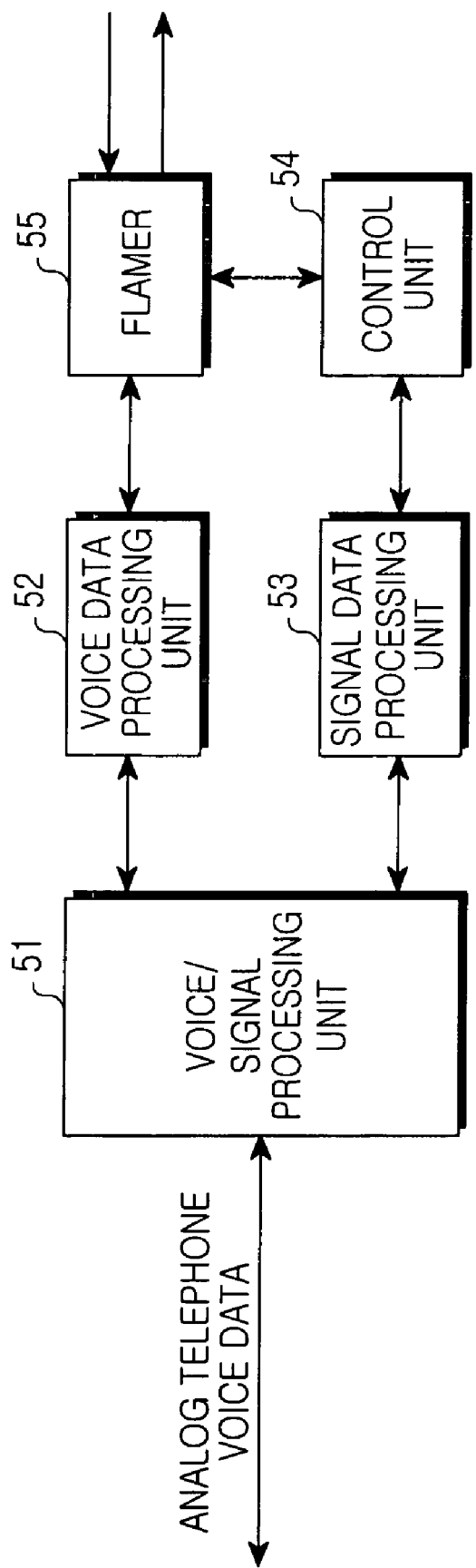
FIG. 5 is a block diagram illustrating the construction of a telephone data processing/reverse-processing unit of the optical communication system providing the telephone service according to the present invention.

FIG. 5 is a block diagram illustrating the construction of the telephone data processing/reverse-processing unit 406 (of FIG. 4*b*) of the optical communication system providing the telephone service according to the present invention.

In the present invention, the telephone data processing unit and the telephone data reverse-processing unit servers to divide the analog telephone voice signal into the voice data and the signaling data, convert the voice signal and the signaling data into digital signals, and flame the converted digital signals to one digital telephone signal. Further, the telephone data processing unit and the telephone data reverse-processing unit divide the digital telephone signal into the voice digital data and the signaling digital data, and convert them into analog signals to output the analog telephone signals. Accordingly, the telephone data processing unit and the telephone data reverse-processing unit have symmetrical structures.

In detail, the telephone data processing/reverse-processing unit includes a voice/signal processing unit 51 for dividing the analog telephone voice data into the voice data and the signaling data, a voice data processing unit 52 for converting the voice data divided by the voice signal processing unit 51 into the voice digital data, a signal data processing unit 53 for converting the signaling data divided by the voice signal processing unit 51 into the signaling digital data, a flamer 55 for flaming the voice digital data and the signaling digital data into one digital telephone data, and a control unit 54 for controlling the flamer 55 to flame the signaling digital data of the signal data processing unit 53 and the voice digital data into one digital telephone data. Typically, the voice digital data converted by the voice data processing unit becomes PCM data. More specifically, the control unit 54 transfers out-of-band signaling digital data to the flamer 55, and the flamer 55 packetizes the voice digital data converted by the voice data processing unit 52 and the out-of-band signaling digital data in a specified form and then outputs the packetized data.

Figure 6:
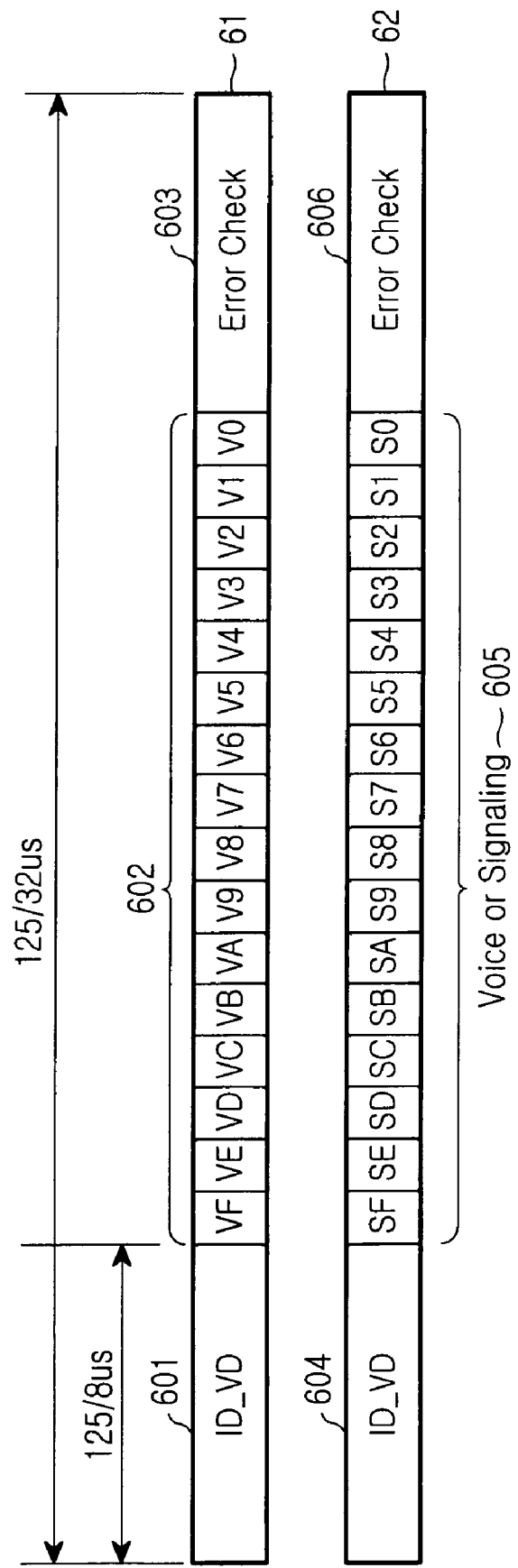
FIG. 6 is a view illustrating an example of digital-converted telephone data used in the present invention.

FIG. 6 is a view illustrating an example of digital-converted telephone data used according to the present invention.

As shown, the telephone data flamed by the flamer 55 is divided into a packet 61 for the voice data and a packet 62 for the signaling data, each of which is comprised of four bytes.

The packet 61 for the voice data is comprised of a one-byte ID_VD field 601 for indicating a packet ID, a two-byte voice data field 602 for carrying and transferring PCM data obtained through a digital conversion of the telephone voice data, and a one-byte error check field 603 for detecting a transmission error.

Meanwhile, the packet 62 for the signaling data is comprised of a one-byte ID_SD field 604 for indicating a packet ID, a two-byte signaling data field 605 for carrying and transferring the signaling data, and a one-byte error check field 606 for detecting a transmission error.

Here, in the signaling data field 605 of the packet 62 for the signaling data, a specified bit of the corresponding field 605 is represented as '1' or '0' according to the existence/nonexistence of the out-of-band signaling information that cannot be represented in the packet 61 for the voice data.

Accordingly, the present invention as described above has an effect in that the telephone service can be implemented in the FTTH optical communication system by applying an A/D conversion and D/A conversion device with respect to the telephone voice signal. Additionally, the present invention has an advantage that the telephone call between the TDX switching system of the telephone office and the general analog telephone at home can be applied to the FTTH optical communication system at a low cost for the system installation. Note that the method according to the present invention can be implemented by a program and stored in a recording medium (such as a CD ROM, RAM, floppy disk, hard disk, optomagnetic disk, etc.) in a computer-readable form.

While the present invention has been shown and described with reference to certain preferred embodiments thereof, it will be understood by those skilled in the art that various changes in form and details may be made therein without departing from the spirit and scope of the present invention. For example, the optical communication system according to the present invention has a WDM-PON structure, but the present invention is not limited thereto. In multiplexing the telephone/broadcasting/communication data and transferring the multiplexed data to the respective subscriber devices, other methods such as CDMA system and so on may be adopted in addition to the WDM system. In addition, various modifications and variations can be made in the present invention, and thus it is intended that the present invention covers the modifications and variations of this invention provided they come within the scope of the appended claims and their equivalents.

What is claimed is:

1. An optical communication system for providing a broadcasting service and a data communication service to a plurality of subscribers, the optical communication system comprising:

an OLT (Optical Line Terminal) for generating a digital downlink telephone voice data in response to analog telephone voice signals from the plurality of subscribers via a PSTN (Public Switched Telephone Network), for multiplexing the generated digital telephone voice data together with a broadcasting data and a communication data into a multiplexed downlink data, and for converting the multiplexed data into optical signals for a subsequent transmission to the plurality of subscribers;

wherein the OLT being further configured for converting optical signals transferred upward into electric signals, demultiplexing and converting the uplink telephone voice data into analog telephone voice signals for a subsequent transmission to the PSTN;

a plurality of ONTs (Optical Network Terminals) for converting the optical signals transferred from the OLT into electric signals, for demultiplexing the broadcasting data, the communication data, and the digital-converted downlink telephone voice data, and for converting the demultiplexed downlink telephone voice data into downlink analog signals for subsequent transmission to the plurality of subscribers, wherein the ONTs being further configured for generating digital uplink telephone voice data by converting the analog voice data from the plurality of subscribers into the digital telephone voice data, multiplexing the digital uplink telephone voice data together with the uplink communication data of the OLT for a subsequent transmission to the OLT; and an optical branching filter for branching the signals from the OLT to the plurality of ONTs, and combining and transferring the signals from the plurality of ONTs to the OLT;

wherein the OLT comprises:

a telephone switching system for receiving analog telephone voice data of the plurality of subscribers from a public switched telephone network (PSTN), separating the analog telephone voice data by subscribers, and transferring uplink analog voice data transferred from the ONTs to the PSTN;

a plurality of first telephone data processing units, connected to the telephone switching system, for converting the transferred analog telephone voice data into digital telephone voice data in order to generate and transfer downlink telephone voice data, and converting the uplink telephone voice data into analog telephone voice data in order to generate and transfer the uplink analog voice data to the telephone switching system;

a plurality of first broadcasting/communication/telephone multiplexers for multiplexing the downlink telephone voice data from the first telephone data processing unit together with broadcasting data for the broadcasting service and communication data for the data communication service;

a plurality of first optical transmitters for performing an electrical/optical conversion of optically converting the multiplexed data output from the first broadcasting/communication/telephone multiplexer that is separately provided for each of the plurality of subscribers, into a optical signal with a different wavelength;

a WDM multiplexer for multiplexing and outputting the optically converted signals from the first optical transmitter and outputting the multiplexed converted signals to the optical branching filter;

a WDM demultiplexer for separating the optical signals from the ONT that are transmitted via the optical branching filter, based on a wavelength of the optical signals;

a plurality of first optical receivers for receiving and converting the separated optical signals from the ONTs into electric signals, the first optical receiver being provided for each of the plurality of subscribers; and a telephone demultiplexer for demultiplexing the electric signals transferred from the first optical receiver, separating and transferring the uplink telephone voice data to the first telephone data processing unit, the telephone demultiplexer being provided for each of the plurality of subscribers;

a broadcasting switch for switching and outputting MPEG (Motion Picture Experts Group) broadcasting data input by a plurality of broadcasting channels;

a controller for supplying the broadcasting switch with a signal that is used to select a broadcasting channel based on a service user's demand;

a first Ethernet switch for switching a direction of a communication/broadcasting/telephone multiplexer of communication data in order to determine which one among the uplink IP network or the ONT the communication data is transmitted to; and a second Ethernet switch for separating channel information data of a service user's preferred digital broadcasting from communication data of a service user and switching the channel information data and the communication data, wherein the telephone demultiplexer demultiplexes an electrical signal from the first optical receiver and supplies the second Ethernet switch with the demultiplexed electrical signals together with a signal for selecting a broadcasting channel and IP communication data: the second Ethernet switch supplies the controller with the input signal for selecting a broadcasting channel in order to control the broadcasting switch and supplies the first Ethernet switch with the input signal for selecting a broadcasting channel in order to transfer the input IP communication data to uplink IP network; the first telephone data processing unit divides a respective subscriber's analog telephone voice data outputted from the telephone switching system into analog voice data and signaling data, digitally converts the analog voice data and the signaling data, and transfers the converted digital telephone data to respective communication/broadcasting/telephone multiplexers provided for respective subscribers; the optical branching fitter comprises a first optical branching filter for branching signals from the OLT and transferring the branched signals to the plurality of ONTs and a second branching filter for combining signals from the plurality of ONTs and transferring the combined signals to the OLT.

2. The optical communication system as claimed in claim 1, wherein the voice data packet includes:

a one-byte ID_VD field for indicating an ID of the voice data packet;

a two-byte voice data field for transferring PCM data obtained by converting the analog voice signal; and a one-byte error check field for detecting a transmission error of the voice data packet.

3. The optical communication system as claimed in claim 1, wherein the signaling data packet includes:

a one-byte ID_SD field for indicating an ID of the signaling packet;

a two-byte signaling data field for carrying and transferring the out-of-band signaling information used for the telephone service; and a one-byte error check field for detecting a transmission error of the signaling data packet.

4. The optical communication system as claimed in claim 1, wherein the OLT comprises:

a telephone switching system for receiving analog telephone voice signals of the plurality of subscribers from the PSTN, separating the analog telephone voice signals from the plurality of subscribers, and transferring uplink analog voice data transferred from the ONTs to the PSTN;

a first telephone data processing unit, coupled to the telephone switching system, for converting the transferred analog telephone voice signals into the digital telephone voice data to generate and transfer downlink telephone voice data, and converting the uplink telephone voice data into the analog telephone voice data to generate and transfer the uplink analog voice data to the telephone switching system;

a first broadcasting/communication/telephone multiplexer for multiplexing the downlink telephone voice data from the first telephone data processing unit together with the broadcasting data and the communication data;

a first optical transmitter for performing an electrical/optical conversion of the multiplexed data output from the first broadcasting/communication/telephone multiplexer;

a first optical receiver for receiving and converting the optical signals from the ONTs into electric signals; and a telephone demultiplexer for demultiplexing the electric signals transferred from the first optical receiver, and separating and transferring the uplink telephone voice data to the first telephone data processing unit.

5. The optical communication system as claimed in claim 4, wherein the first telephone data processing unit comprises:

a voice/signal processing unit for dividing the analog telephone voice data from the telephone switching system into the voice data and the signaling data;

a voice data processing unit for converting the voice data divided by the voice signal processing unit into voice digital data;

a signal data processing unit for converting the signaling data divided by the voice signal processing unit into signaling digital data;

wherein the flamer transferring the flamed telephone voice data to the first broadcasting/communication/telephone multiplexer; and a control unit for controlling the flamer to flame the signaling digital data of the signal data processing unit and the voice digital data into one downlink telephone voice data, wherein uplink analog voice data is generated by receiving and converting the uplink telephone voice data from the flamer into the uplink analog voice data, and the uplink analog voice data is transferred to the telephone switching system.

6. The optical communication system as claimed in claim 4, wherein the ONT the number of which corresponds to the specified number of subscribers, comprises:

a second optical receiver for converting the optical signal transferred from the OLT through the optical branching filter into electric signals;

a second broadcasting/communication/telephone demultiplexer for demultiplexing the electric signals transferred from the second optical receiver to the broadcasting data, the communication data and the downlink telephone voice data;

a second telephone data processing unit for converting the downlink telephone voice data demultiplexed through the second broadcasting/communication/telephone demultiplexer into analog telephone voice data to transfer the converted analog telephone voice data to a subscriber's telephone, and converting the analog voice data from the subscriber's telephone into digital voice data to generate and transfer the uplink telephone voice data;

a telephone multiplexer for multiplexing the uplink telephone voice data transferred from the second telephone data processing unit and the uplink communication data of the OLT; and a second optical transmitter for performing an electrical/optical conversion of the multiplexed signal output from the telephone multiplexer and transferring the converted optical signal to the optical branching filter.

7. The optical communication system as claimed in claim 6, wherein the second telephone data processing unit comprises:

a voice/signal processing unit for dividing the analog telephone voice data from the subscriber's telephone into the voice data and the signaling data;

a voice data processing unit for converting the voice data divided by the voice signal processing unit into voice digital data;

a signal data processing unit for converting the signaling data divided by the voice signal processing unit into signaling digital data;

a flamer for flaming the voice digital data and the signaling digital data into one uplink telephone voice data and transferring the flamed telephone voice data to the telephone multiplexer; and a control unit for controlling the flamer to flame the signaling digital data of the signal data processing unit and the voice digital data into one uplink telephone voice data, wherein downlink analog voice data is generated by receiving and converting the downlink telephone voice data from the flamer into the analog voice data, and the downlink analog voice data is transferred to the subscriber's telephone.

8. The optical communication system as claimed in claim 1, wherein the downlink and uplink telephone voice data include a voice data packet for transferring analog voice data and a signaling data packet for transferring out-of-band signaling information used for a telephone service.

* * * * *